United States Patent [19]

Geiger

[11] 4,105,243

[45] Aug. 8, 1978

[54] OUTER BODY PANEL STRUCTURE FOR VEHICLE BODIES

[75] Inventor: Friedrich Geiger, Böblingen, Fed. Rep. of Germany

[73] Assignee: Daimler-Benz Aktiengesellschaft, Fed. Rep. of Germany

[21] Appl. No.: 548,005

[22] Filed: Feb. 7, 1975

Related U.S. Application Data

[63] Continuation-in-part of Ser. No. 233,104, Mar. 9, 1972, abandoned.

[30] Foreign Application Priority Data

Mar. 12, 1971 [DE] Fed. Rep. of Germany ....... 2111876

[51] Int. Cl.² .......................................... B62D 25/02
[52] U.S. Cl. .................................... 296/28 R; 296/29
[58] Field of Search ............... 296/28 R, 28 G, 28 K, 296/29

[56] References Cited

U.S. PATENT DOCUMENTS

| | | | |
|---|---|---|---|
| 1,909,287 | 5/1933 | Ledwinka | 296/28 R |
| 2,116,313 | 5/1938 | Lundberg | 296/28 R |
| 2,125,476 | 8/1938 | Westrope et al. | 296/28 G |
| 2,407,112 | 9/1946 | Trautvetter | 296/28 R |
| 2,689,765 | 9/1954 | Lindsay | 296/28 R |
| 2,827,327 | 3/1958 | Lindsay | 296/28 K |
| 3,580,628 | 5/1971 | Rantala | 296/28 R X |
| 3,590,936 | 7/1971 | Wessells | 296/28 R |

FOREIGN PATENT DOCUMENTS

| | | | |
|---|---|---|---|
| 520,973 | 6/1921 | France | 296/29 |
| 158,739 | 11/1939 | Fed. Rep. of Germany | 296/28 R |
| 2,111,876 | 9/1972 | Fed. Rep. of Germany | 296/29 |

Primary Examiner—Trygve M. Blix
Assistant Examiner—Winston H. Douglas
Attorney, Agent, or Firm—Craig & Antonelli

[57] ABSTRACT

An outer body panel structure for vehicle bodies, especially for passenger motor vehicle bodies, which consists of several outer body panel members which are arranged abutting one another; the abutting places are thereby constructed as intentionally visible separating places, utilizes profile means and/or an offset arrangement of the outer body panels.

22 Claims, 11 Drawing Figures

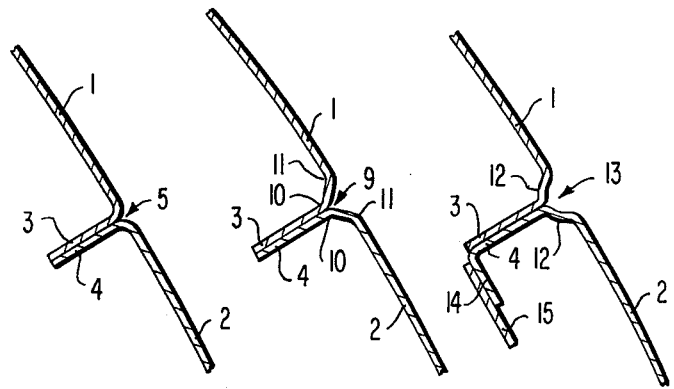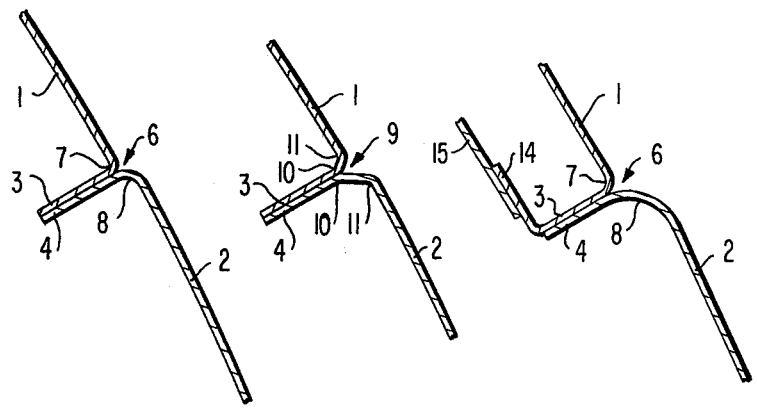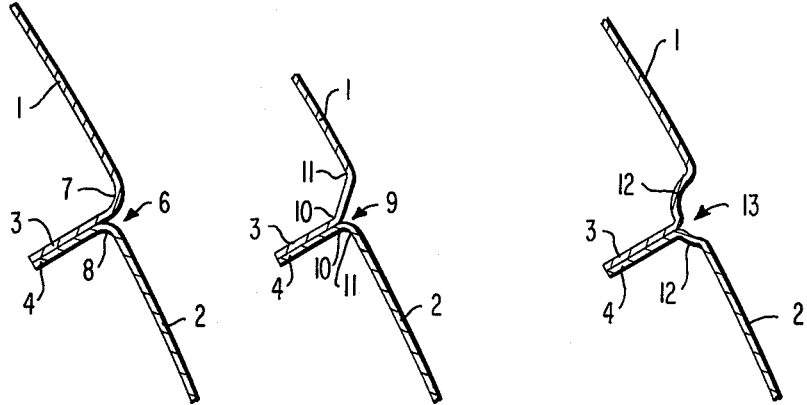

OUTER BODY PANEL STRUCTURE FOR VEHICLE BODIES

This is a continuation-in-part of application Ser. No. 233,104 filed Mar. 9, 1972, abandoned.

The present invention relates to an outer panel covering for vehicle bodies, especially in passenger motor vehicles, which consists of several outer sheet metal panels that are arranged abutting at one another.

With prior art motor vehicles the abutting places are so constructed that they are no longer visible from the outside in the finished vehicle. For that purpose they have to be finished and trimmed completely satisfactorily in a time-consuming manner which is also injurious to health. In order to be able to dispense with this time-consuming work, it is also known to cover up the abutting places by means of decorative strips. However, this covering also requires a considerable expenditure in time whereas it additionally leads to increased costs.

The present invention is concerned with the task to provide an outer body paneling of the aforementioned type which permits a reduction in manufacturing costs and assures nonetheless a pleasing appearance. The present invention essentially consists in that the abutting or joint places are constructed as visible separating places by means of profile means and/or offset arrangement of the outer body panels, such as of the outer sheet metal body panels. A separate operation or an additional covering of the abutting locations can be dispersed with in this construction while an appealing exterior of the body can be obtained nonetheless.

It is provided according to the present invention that the abutting edges of the outer body panels are directed inwardly approximately at right angles and adjoin at the remaining part of the outer body panel by way of profile means. By the use of such profiles, on the one hand, an appealing exterior is achieved while, on the other, the alignment and fitting is simplified since the edges can be slightly deformed in the profiled areas without leading to disturbing deformations in the remaining part of the outer body sheet metal members.

In one simple embodiment of the present invention, the edges adjoin the remaining part of the outer sheet metal member by means of rounded-off portions. In another embodiment of the present invention the edges are angularly bent off in at least two steps. These steps, which together produce an angle of 90°, may be utilized for achieving a particular optical effect. In a further embodiment of the present invention, grooves or the like which are indented or pressed-in in a diagonal direction with respect to the outer sheet metal body member and the edges, serve as profile means.

In a further embodiment of the present invention, the outer sheet metal panels which lie in the same plane are provided at the abutting places thereof with symmetrically identical profile means. In another particularly advantageous embodiment, the outer sheet metal body panels which are arranged offset to one another are provided at the abutting places thereof with differently large and/or differently formed profile means.

Accordingly, it is an object of the present invention to provide an outer body panel structure which avoids by simple means the aforementioned shortcomings and drawbacks of the prior art.

Another object of the present invention resides in an outer body panel construction which dispenses with the need of time-consuming and costly finishing operations that are frequently also injurious to health.

A further object of the present invention resides in an outer panel construction for vehicle bodies which permits a simplification and cost-reduction in the manufacture thereof.

Still another object of the present invention resides in a vehicle body structure of the type described above which assures a pleasing appearance of the vehicle outside.

These and other objects, features and advantages of the present invention will become more apparent from the following description when taken in conjunction with the accompanying drawings which shows, for purposes of illustration only, several embodiments in accordance with the present invention, and wherein:

FIGS. 1, 1a and 1b are partial cross-sectional views through three embodiments of outer body panel coverings in accordance with the present invention;

FIGS. 2, 2a and 2b are partial cross-sectional views through three further embodiments of outer body panel coverings in accordance with the present invention;

FIGS. 3, 3a and 3b are partial cross-sectional views through three still further embodiments of outer body panel coverings in accordance with the present invention;

Figure 4:
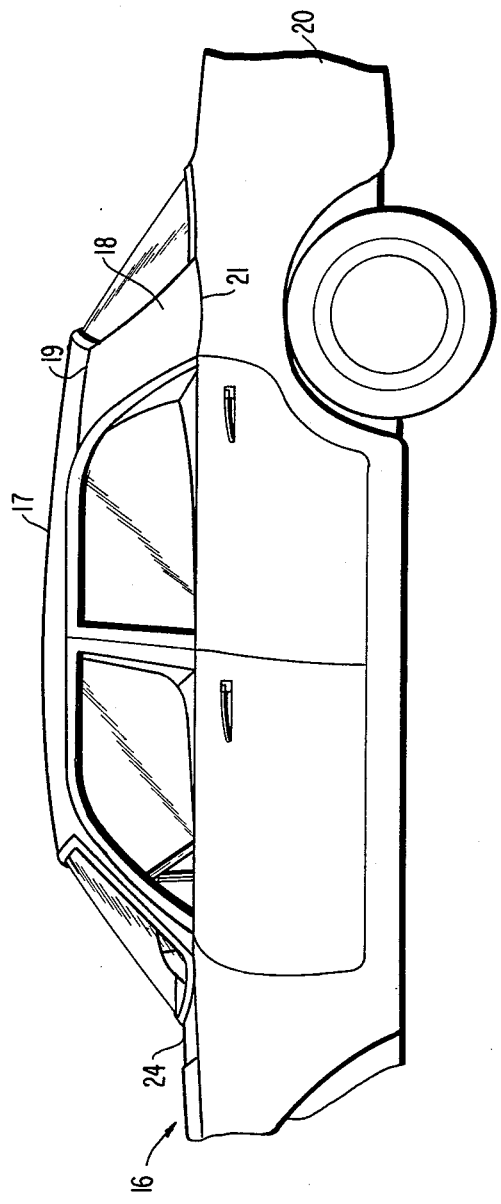
FIG. 4 is a partial schematic side view of a motor vehicle illustrating the location of the abutting places of the outer body panel coverings in accordance with the present invention.

Referring now to the drawing wherein like reference numerals are used throughout the various views to designate like parts, and more particularly to FIG. 1, two outer sheet metal members 1 and 2 constituting outer body panels of an outer covering for a vehicle body are illustrated in this figure which abut at one another by means of inwardly bent off edges 3 and 4 bent off approximately at right angle. It is known to hide the abutting place 5 on the outside by trimming or to cover the same by decorative strips.

In the embodiment according to FIG. 1a, the two outer body panel members 1 and 2 made from sheet metal or any other suitable known material, which also include angularly bent edges 3 and 4, are arranged mutually offset so that a separating place 6 is created in the form of a step which is intentionally visible from the outside. A quite intentional optical effect is achieved by this separating place 6 which makes superfluous the covering thereof by means of decorative strips or the trimming and finishing thereof. The embodiment according to FIG. 1b corresponds in principle to the embodiment according to FIG. 1a whereby the outer sheet metal member 1 is arranged further outwardly than the outer sheet metal member 2 so that the step in the separating place 6 results in the reverse direction. The edges 3 and 4 adjoin the remaining portions of the sheet metal members 1 and 2 by way of rounded-off portions 7 and 8. They may be of identical dimensions. However, if one of the rounded-off portions 7 or 8 is selected larger than the other, then it is always the one which connects the edge with the sheet metal member that is disposed farther outwardly.

In the embodiments according to FIGS. 2, 2a and 2b a visible separating place 9 is created in that the edges 3 and 4 are angularly bent off from the remaining portions of the outer sheet metal members 1 and 2 in two steps 10 and 11. The separating place 9 thus receives a configuration which is V-shaped in cross section. In the embodiments according to FIGS. 2a and 2b, the outer sheet metal member 1 or 2 is disposed offset to the respective other sheet metal member 2 or 1, which is achieved in that the webs remaining between the steps 10 and 11 are constructed of different length.

In the embodiments according to FIGS. 3 and 3b, the transition places between the outer sheet metal members 1 and 2 and the edges 3 and 4 adjoining the same approximately at right angle are provided with groove-shaped profile means 12 which produce a visible separating place 13. In the embodiment according to FIG. 3, the separating place 13 has an approximately semicircularly cross section whereby the two outer sheet metal members 1 and 3 are disposed in a common plane. In the embodiment according to FIG. 3b, the outer sheet metal members 1 and 2 are disposed mutually offset whereby the profile means 12 between the outer sheet metal member 1 and the edge 3 assumes an approximately quarter of a circle whereas the profile means 12 between the outer sheet metal member 2 and the associated edge 4 is kept considerably smaller. Both profile means 12 have approximately the same radius of curvature.

The embodiment according to FIG. 3a corresponds in principle to the embodiments according to FIGS. 1a and 1b whereby, however, the rounded-off portion 8 has a considerably larger radius of curvature.

As illustrated in FIGS. 3 and 3a, the edges of the outer sheet material members 1 and/or 2 can be bent off once more inwardly thereof and can be constructed as flanges 14 for the mounting of interior sheet metal members 15 for example, members forming an internal cover plate closing the door column to form an air-supplying or ventilating duct.

If the outer sheet metal members 1 and 2 are disposed approximately in the same plane, then the transition places between the outer sheet metal members 1 and 2 and the edges 3 and 4 receive identical or at least substantially similar profile means 7 and 8 or 10 and 11 or 12. If the outer sheet metal members 1 and 2 are disposed mutually offset, then the abutting places formed thereby appropriately receive differently large and differently formed profile means within the area between the edges 3 and 4 and the remaining portions of the outer sheet metal members 1 and 2. It is thereby possible to combine with one another at will all profile means corresponding to FIGS. 1 and 3. However, in most cases it will be appropriate for achieving a uniform optical impression to utilize always profile means constructed, in principle, similarly which differ only by different dimensions.

Figure 5:
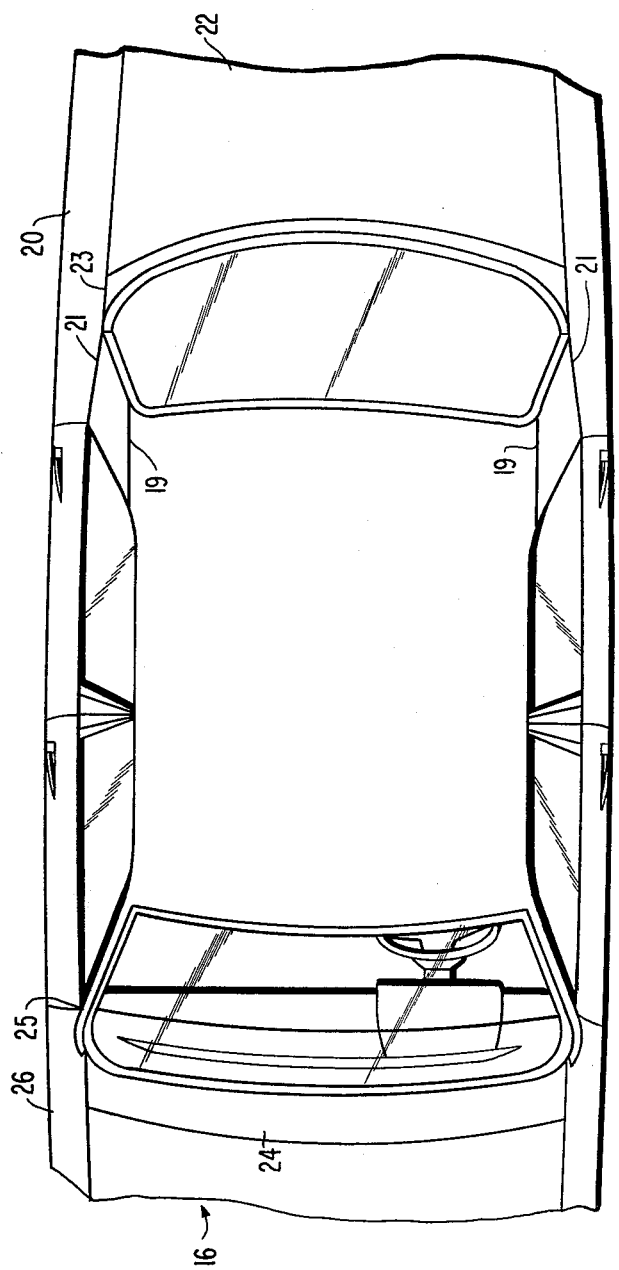
FIG. 5 is a partial schematic top view of the motor vehicle illustrated in FIG. 4.

FIGS. 4 and 5 illustrate the preferable locations for the visible separating places of the present invention. As shown in these figures, a motor vehicle generally designated by the reference numeral 16 includes a roof structure 17 the rear portion of which is joined to lateral support posts 18 by way of a joint 19. The lower portion of the lateral support posts 18 abuts an upper edge portion of the rear fender or quarter panel 20 to form a further visible separating plate or joint 21. By virtue of the twin joint connection 19, 21 of the lateral support posts 18 to the roof structure 17 and the rear fender 20, it is understood that both the upper and lower ends of the posts 18 are provided with inwardly directed edges such as shown in FIGS. 1-3b which edges adjoin the remaining portions of the support posts 18 by suitable connecting surface portions, for example, portions 7, 8 of FIGS. 1a or 1b.

A portion of the rear deck 22 abuts the upper edge portion of the rear fender 20 to form a visible separating place or joint 23. At the front of the vehicle 16, a cowl 24 is provided and forms a visible separating place or joint 25 with a front fender assembly 26 of the vehicle.

As readily apparent from FIGS. 4 and 5, the sheet metal members 1 or 2 of FIGS. 1-3b readily form the respective component elements which constitute the vehicle outer body cover structure. While any one of the visible separating places 5, 6, 9, 13 may readily be utilized to form the joints 19, 21, 23 and 25, preferably, to maintain an appealing exterior of the outer body covering, the joint 19 may be constructed in the manner illustrated in FIGS. 1b, 2b and 3b. Thus, for example, the sheet metal member 2 of FIG. 1b could readily form the lateral post 18 with the sheet metal member 1 forming the roof structure 17 whereby a visible separating place 6 would be formed at the joint 19 with a surface portion of the lateral support post 18 being disposed in a plane spaced inwardly from a plane in which a surface portion of the roof structure 17 is disposed.

Preferably, the joint 21 may be constructed in the manner illustrated in FIGS. 1a, 2a, and 3a; and the joints 23 and 24 may be constructed as illustrated in FIGS. 2, 2b, 3 and 3b. In the former joint construction 21, the sheet metal members 1 and 2 may form the lower end of the lateral support posts 18 and the rear fender 20, respectively; whereas, in the latter joint constructions 23, 25, the sheet metal members 1, 2 may form either the rear deck 22 and rear fender 20 or the cowl 24 and front fender 25.

While I have shown and described several embodiments in accordance with the present invention, it is understood that the same is not limited thereto but is susceptible of numerous changes and modifications as known to those skilled in the art, and I, therefore, do not wish to be limited to the details shown and described herein but intend to cover all such changes and modifications as are encompassed by the scope of the appended claims.

I claim:

1. A motor vehicle outer cover structure comprising a plurality of motor vehicle outer body panel means, each of said outer body panel means including a first portion and an angularly extending portion terminating in an inwardly directed edge portion, the inwardly directed edge portions of adjacent body panel means being arranged in abutting relationship with the angularly extending portions to define an intentionally visible separating place of a predetermined profile, said edge portions are directed inwardly approximately at a right angle and abut against one another, and said angularly extending portion includes grooves pressed-in diagonally with respect to the outer body panel means to form said predetermined profile.

2. A motor vehicle outer cover structure according to claim 1, wherein said outer body panel means are disposed in substantially the same plane, and wherein said angularly extending portions are substantially symmetrically constructed.

3. A motor vehicle outer cover structure comprising a plurality of motor vehicle outer body panel means, each of the outer body panel means including a first surface portion and an angularly extending surface portion terminating in an inwardly directed surface portion, the inwardly directed surface portions of adjacent body panel means being arranged in abutting relationship so that the angularly extending surface portions define an intentionally visible separating place of a predetermined profile, wherein said angularly extending surface portions are substantially similarly constructed.

4. A motor vehicle outer cover structure comprising a plurality of motor vehicle outer body panel means, each of said outer body panel means including a first portion and an angularly extending portion terminating in an inwardly directed edge portion, the inwardly directed edge portions of adjacent body panel means being arranged in abutting relationship with the angularly extending portions to define an intentionally visible separating place of a predetermined profile, said angularly extending portions include grooves pressed-in diagonally with respect to the outer body panel means to form said predetermined profile.

5. A motor vehicle having a vehicle body including a vehicle outer cover structure formed of a plurality of motor vehicle body panel means, the improvement comprising: each of said motor vehicle body panel means includes a first surface, a second surface disposed at a substantially right angle to said first surface, and a third surface extending at an angle to said first surface and said second surface and interconnecting said first and second surfaces, said second surfaces of each of said motor vehicle body panel means being joined in abutting relationship whereby said third surface of one motor vehicle body panel means forms a predetermined visible separation between said motor vehicle body panel means with the third surface of an adjacent vehicle body panel means extending angularly outwardly away from each other to define a widened groove opening downwardly in the direction of said first surfaces, and wherein said third surfaces of the body panel means are together substantially similarly constructed.

6. A motor vehicle according to claim 5, wherein adjacent motor vehicle body panel means are disposed in spaced parallel planes.

7. A motor vehicle outer cover structure according to claim 6, wherein said third surfaces are offset with respect to each other to form said predetermined profile.

8. A motor vehicle according to claim 5, wherein said third surface is substantially planar and is interconnected with said first and second surface by a pair of angularly extending surface portions.

9. A motor vehicle according to claim 8, wherein adjacent motor vehicle body panel means are disposed in substantially the same plane, and wherein said angularly extending portions are substantially symmetrically constructed.

10. A motor vehicle according to claim 8, wherein adjacent motor vehicle body panel means are disposed in spaced parallel planes.

11. A motor vehicle according to claim 5, wherein a fourth surface is provided connected to said second surface and disposed substantially parallel to said first surface said fourth surface being provided for mounting at least one of said motor vehicle body panel means to a portion of the motor vehicle.

12. A motor vehicle according to claim 5, wherein one of said motor vehicle body panel means forms a roof structure, another of said motor vehicle body panel means forms a lateral support post, the second surfaces of the roof structure and the lateral support posts being joined in abutting relationship whereby the third surfaces thereof form the predetermined visible separation, the third surfaces of the roof structure and lateral support posts are substantially planar and interconnected with the first and second surfaces by a pair of angularly extending surface portions.

13. A motor vehicle according to claim 12, wherein the first surface portions of said roof structure and said lateral support posts are disposed in spaced parallel planes.

14. A motor vehicle according to claim 12, wherein the first surface portions of the roof structure and lateral support posts are disposed in substantially the same plane.

15. A motor vehicle according to claim 5, wherein one of said motor vehicle body panel means forms a roof structure, another of said motor vehicle body panel means forms a lateral support post, the second surfaces of the roof structure and the lateral support post being joined in abutting relationship whereby the third surfaces thereof form the predetermined visible separation, said third surfaces of said roof structure and lateral support post being bowed outwardly in a direction away from one another so as to form a separation which is semi-circular in cross section.

16. A motor vehicle according to claim 15, wherein said first surfaces of said roof structure and said lateral support posts are disposed in substantially the same plane.

17. A motor vehicle according to claim 15, wherein the first surfaces of the roof structure and the lateral support posts are disposed in spaced parallel planes.

18. A motor vehicle having a vehicle body including a vehicle outer cover structure formed of a plurality of motor vehicle body panel means, the improvement comprising: each of said motor vehicle body panel means includes a first surface, a second surface disposed at a right angle to said first surface, and a third surface extending at an angle to said first surface and said second surface and interconnecting said first and second surfaces, said second surfaces of each of said motor vehicle body panel means being joined in abutting relationship whereby said third surface of adjacent motor vehicle body panel means form a predetermined visible separation between said motor vehicle body panel means with the third surfaces of the respective vehicle body panel means extending angularly outwardly away from each other to define a widened groove opening outwardly in the direction of said first surfaces, wherein said third surfaces include grooves pressed-in diagonally with respect to said motor vehicle body panel means.

19. A motor vehicle having a vehicle body including a vehicle outer cover structure formed of a plurality of motor vehicle body panel means, the improvement comprising: each of said motor vehicle body panel means includes a first surface, a second surface disposed at a right angle to said first surface, and a third surface extending at an angle to said first surface and said second surface and interconnecting said first and second surfaces, said second surfaces of each of said motor vehicle body panel means being joined in abutting relationship whereby said third surface of adjacent motor vehicle body panel means form a predetermined visible separation between said motor vehicle body panel means with the third surfaces of the respective vehicle body panel means extending angularly outwardly away from each other to define a widened groove opening outwardly in the direction of said first surfaces, wherein said third surfaces of adjacent motor vehicle body panel means are bowed outwardly in a direction away from one another so as to form a separation which is semi-circular in cross section.

20. A motor vehicle having a vehicle body including a vehicle outer cover structure formed of a plurality of motor vehicle body panels, the improvement comprising: each of said motor vehicle body panels includes a first surface portion, a second surface portion disposed at an angle to said first surface portion, and a third surface portion interconnecting said first and second surface portions, said second surface portions of each of said motor vehicle body panel means being joined in abutting relationship whereby said third surface portions of the adjacent motor vehicle body panel means form a predetermined visible separation between said motor vehicle body panel means, one of said motor vehicle body panel means forms a roof structure, another of said motor vehicle body panel means forms a lateral support post, the second surface portion of the roof structure and the lateral support post being joined in abutting relationship whereby the third surface portions thereof form the predetermined visible separation, a further body panel means forms the rear fender, said lateral support post being provided at a lower end thereof with a fourth surface portion and a fifth surface portion for interconnecting said fourth surface portion with the first surface portion thereof, the fourth surface portion of the lateral support post being joined in abutting relationship with the second surface portion of the rear fender whereby the fifth surface portion of the lateral support post and the third surface portion of the rear fender form the predetermined visible separation between the lower end of the lateral support post and the rear fender.

21. A motor vehicle according to claim 20, wherein the first surface portions of the lateral support post and the rear fender are disposed in spaced parallel planes.

22. A motor vehicle according to claim 20, wherein the third surface portion of said rear fender and the fifth surface portion of the lateral support post are substantially planar and are interconnected with the respective remaining surface portions by a pair of angularly extending portions.

* * * * *